US012635624B2

(12) United States Patent
Orsi et al.

(10) Patent No.: US 12,635,624 B2
(45) Date of Patent: May 26, 2026

(54) NUTRIENT COMPOSITIONS

(71) Applicant: OMS Investments, Inc., Los Angeles, CA (US)

(72) Inventors: Jennifer Orsi, Santa Rosa, CA (US); Abigail Prickett, Marysville, OH (US); Joseph Craig, Marysville, OH (US); Brian Birrenkott, Dublin, OH (US)

(73) Assignee: OMS Investments, Inc., Los Angeles, CA (US)

( * ) Notice: Subject to any disclaimer, the term of this patent is extended or adjusted under 35 U.S.C. 154(b) by 395 days.

(21) Appl. No.: 16/689,652

(22) Filed: Nov. 20, 2019

(65) Prior Publication Data

US 2020/0154652 A1 May 21, 2020

Related U.S. Application Data

(60) Provisional application No. 62/770,216, filed on Nov. 21, 2018.

(51) Int. Cl.

| | |
|---|---|
| *A01G 24/10* | (2018.01) |
| *A01G 24/42* | (2018.01) |
| *C05C 7/00* | (2006.01) |
| *C05C 11/00* | (2006.01) |
| *C05D 1/00* | (2006.01) |
| *C05D 5/00* | (2006.01) |
| *C05G 1/00* | (2006.01) |
| *C05G 5/10* | (2020.01) |

(52) U.S. Cl.
CPC ............. *A01G 24/10* (2018.02); *A01G 24/42* (2018.02); *C05C 7/00* (2013.01); *C05C 11/00* (2013.01); *C05D 1/00* (2013.01); *C05D 5/00* (2013.01); *C05G 1/00* (2013.01); *C05G 5/10* (2020.02)

(58) Field of Classification Search
CPC .. C05G 5/10; C05C 7/00; C05C 11/00; C05C 1/00; C05C 5/00; A01G 24/10; A01G 24/42; C05D 1/00; C05D 5/00; C05D 3/00; C05B 7/00
See application file for complete search history.

(56) References Cited

U.S. PATENT DOCUMENTS

| | | | |
|---|---|---|---|
| 4,088,528 A | 5/1978 | Berger et al. | |
| 4,185,680 A | 1/1980 | Lawson | |
| 5,269,634 A | 12/1993 | Chynoweth et al. | |
| 5,413,618 A | 5/1995 | Penningsfeld et al. | |
| 5,542,962 A | 8/1996 | Ollerenshaw et al. | |
| 5,567,220 A | 10/1996 | Thorpe et al. | |
| 5,900,038 A | 5/1999 | Wilhelm et al. | |
| 5,976,211 A | 11/1999 | Fjelldal et al. | |
| 6,711,850 B2 | 3/2004 | Yelanich et al. | |
| 8,024,890 B2 | 9/2011 | Bertin et al. | |
| 2009/0229331 A1 | 9/2009 | Wells | |

FOREIGN PATENT DOCUMENTS

| | | | |
|---|---|---|---|
| EP | 923854 A2 | 6/1999 | |
| JP | 07107869 A | 4/1995 | |
| WO | 9101082 A1 | 2/1991 | |
| WO | 9957079 A1 | 11/1999 | |
| WO | 9957080 A1 | 11/1999 | |
| WO | 2016103162 A2 | 6/2016 | |

OTHER PUBLICATIONS

Amazon. "Masterblend Fertilizer 4-18-38" <https://www.amazon.com/dp/B01MYG8SQZ> Date First Available : Jun. 15, 2016 (Year: 2016).*
Pure Hydroponics. "Premium Hydroponic Nutrient" <https://purehydroponics.com/products/nutrient/> Nov. 7, 2012 (Year: 2012).*
Masterblend International. "Home Growing" <http://www.masterblend.com/buy_online.html> Sep. 25, 2018 (Year: 2018).*
Hochmuth, George J. and Hochmuth, Robert C., "Nutrient Solution Formulation for Hydroponic (Perlite, Rockwool, NFT) Tomatoes in Florida HS796," Institute of Food and Agricultural Sciences, University of Florida, Sep. 1, 2018, https://edis.ifas.ufl.edu/pdffiles/CV/CV21600.pdf (retrieved on Feb. 24, 2020).
Hochmuth, Robert, Leon, Lei Lani, and Hochmuth, George, "Evaluation Of Two Soilless Growing Media And Three Fertilizer Programs In Outdoor Bag Culture For Strawberry In North Florida," Proc. Fla. State Hort. Soc., vol. 111, Jan. 1, 1998, pp. 341-344.
Barak, P., "Essential elements for plant growth. Hydroponics," Apr. 15, 2002, pp. 1-2, https://soils.wisc.edu/facstaff/barak/soilscience326/hydropon.htm (retrieved on Sep. 14, 2020, last modified Mar. 6, 2009).
International Search Report and Written Opinion of the International Searching Authority for International Patent App. No. PCT/US2019/062415 dated as mailed on Mar. 6, 2020; 10 pages.

* cited by examiner

*Primary Examiner* — Jennifer A Smith
(74) *Attorney, Agent, or Firm* — FBT Gibbons LLP

(57) ABSTRACT

Nutrient compositions for plant growth are disclosed. A nutrient composition includes primary macronutrients, including nitrogen, phosphorus, and potassium, secondary macronutrients including calcium and sulfur. A nutrient composition may include micronutrients and additional secondary macronutrients, such as magnesium. Nutrient compositions including such nutrient sources exhibit advantageous plant growth. Hydroponic nutrient composition, water soluble powder, and plant growth mediums containing the nutrient composition, as well as methods of using the nutrient compositions, are further disclosed.

16 Claims, No Drawings

NUTRIENT COMPOSITIONS

CROSS-REFERENCE TO RELATED APPLICATIONS

This application claims the priority benefit of U.S. Provisional Patent App. No. 62/770,216 filed Nov. 21, 2018, which is incorporated herein by reference in its entirety.

TECHNICAL FIELD

The present disclosure relates generally to nutrient compositions. The nutrient compositions facilitate desirable plant growth.

BACKGROUND

Hydroponics is the cultivation of plants using a moving or circulating liquid solution of water and nutrients. The plants may be soil-less or may be positioned in a plant growth medium, such as soil. Hydroponics provides healthier plants faster than traditional growing in soil. Delivery of nutrients to the plant can be regulated more easily in order to optimize plant growth. Current hydroponic systems require two or three different nutrient solutions to provide complete nutrition to the plant due to material incompatibilities or stability issues. It is desirable to provide improved, ready-to-use nutrient compositions for desirable plant growth.

SUMMARY

According to one embodiment, a nutrient composition includes a nitrogen source, a phosphorus source, a potassium source, a calcium source, and a sulfur source. The nutrient composition may include one or more sources of additional components, such as magnesium, boron, copper, iron, manganese, molybdenum, and zinc. The nutrient composition has a nitrogen to phosphorus to potassium (NPK) ratio of 2.5:1:4.5 to 3.5:1:3.5

According to another embodiment, a nutrient composition includes primary macronutrients at a concentration of 355 ppm to 440 ppm, the primary macronutrients comprising a nitrogen source, a phosphorus source, and a potassium source. The nutrient composition further includes secondary macronutrients at a concentration of 140 ppm to 235 ppm, the secondary macronutrients comprising a sulfur source and a calcium source.

According to other embodiments, the nutrient composition may form a part of a hydroponic nutrient composition, a water-soluble powder, or a plant growth medium.

DETAILED DESCRIPTION

The following description is intended to convey a thorough understanding of the embodiments by providing various embodiments and details involving nutrient compositions for plant growth. It is understood, however, that the disclosure is not limited to these specific embodiments and details, which are illustrative only. It is further understood that one possessing ordinary skill in the art, in light of known compositions, systems, and methods, would appreciate the use of the disclosure for its intended purposes and benefits in any number of alternative embodiments. The present compositions may broadly be applicable to any plant growth medium, but may be particularly suitable for a hydroponic system. In certain embodiments, a water-soluble powder includes the nutrient composition. As described further below, the nutrient compositions for plant growth described herein improve the ease with which a user grows plants.

Embodiments of a nutrient composition comprise a combination of nutrients. In general, nutrients may be categorized into "primary macronutrients", "secondary macronutrients," and "micronutrients" or trace nutrients. Primary nutrients include nitrogen, phosphorus, and potassium, collectively "NPK." Primary macronutrients are usually needed in the greatest proportion relative to other nutrients. Secondary macronutrients include calcium, magnesium, and sulfur, often in the form of sulfate. Micronutrients are needed in trace amounts and include boron, copper, iron, manganese, molybdenum, and zinc. Additional micronutrients may include cobalt, silicon, and chloride. Typically, the secondary macronutrients are required in smaller quantities than the primary macronutrients and higher quantities than the micronutrients, although this is not always the case. For example, calcium or sulfur, which are secondary macronutrients, may be provided in higher quantities than phosphorus, a primary macronutrient.

Each of the nutrients may be provided by a nutrient source. For example, nitrates and ammonium may each be nutrient sources for nitrogen. A concentration of a particular nutrient refers to the concentration of the nutrient that is biologically available for delivery to the plant. The nutrient concentration does not refer to the concentration of the entire nutrient source (i.e., a nutrient source concentration).

Embodiments of a nutrient composition comprise one or more of the primary nutrients—nitrogen, phosphorus, and potassium. In certain embodiments, the nutrient composition may have a nitrogen to phosphorus to potassium (NPK) ratio of about 2.5:1:4.5 to about 3.5:1:3.5, about 2.8:1:4.2 to about 3.2:1:3.8, or about 3:1:4. In certain embodiments, a ratio of a concentration of nitrogen to the total nutrient concentration is 23% to 25%, or 24%. In certain embodiments, when diluted in an application, nitrogen can be included in a nitrogen source with a nitrogen concentration of 130 parts-per-million ("ppm") to 160 ppm, 145 ppm to 155 ppm, or 150 ppm. In certain embodiments, a ratio of a concentration of phosphorus to the total nutrient concentration is in a range of 8% to 10%, or 9%. In certain embodiments, when diluted in an application, phosphorus can be included in a phosphorus source with a phosphorus concentration of 45 ppm to 65 ppm, 50 ppm to 60 ppm, or 54 ppm. In certain embodiments, a ratio of a concentration of potassium to the total nutrient concentration is in a range of 30% to 35%, or 33%. In certain embodiments, when diluted in an application, potassium can be included in a potassium source with a potassium concentration of 180 ppm to 215 ppm, 200 ppm to 210 ppm, or 205 ppm. The potassium concentration may be greater than the nitrogen concentration. In certain embodiments, when diluted in an application, a concentration of the primary macronutrients is 355 ppm to 440 ppm, 390 ppm to 430 ppm, 400 ppm to 420 ppm, or 409 ppm. In certain embodiments, when diluted in an application, when a nitrogen concentration is 150 ppm, the nutrient composition has a total nutrient concentration of 560 ppm to 685 ppm, 580 ppm to 675 ppm, 600 ppm to 655 ppm, 620 ppm to 635 ppm, or 617 ppm. In certain embodiments, a ratio of a concentration of nitrogen, phosphorus, and potassium to the total nutrient concentration is 60% to 70%, or 66%.

Embodiments of a nutrient composition comprise one or more of the secondary macronutrients. Specifically, embodiments of a nutrient composition comprise sulfur. In certain embodiments, a ratio of a concentration of sulfur to the total nutrient concentration is in a range of 8% to 10%, or 9%. In certain embodiments, when diluted in an application, sulfur can be included in a sulfur source with a sulfur concentration of 45 ppm to 65 ppm, 50 ppm to 60 ppm, or 54 ppm. In certain embodiments, when diluted in an application, a concentration of nitrogen, phosphorus, potassium, and sulfur (NPKS) is 400 ppm to 505 ppm, 445 ppm to 485 ppm, 455 ppm to 475 ppm, or 463 ppm. In certain embodiments, a ratio of the concentration of NPKS to the total nutrient concentration is 70% to 80% or 75%. Additional secondary macronutrients may include calcium and magnesium. In certain embodiments, a ratio of a concentration of calcium to the total nutrient concentration is in a range of 17% to 19%, or 17% to 18%, or 18%. In certain embodiments, when diluted in an application, calcium can be included in a calcium source with a calcium concentration of 95 ppm to 120 ppm, 105 ppm to 115 ppm, or 107 ppm. In certain embodiments, when diluted in an application, a concentration of nitrogen, phosphorus, potassium, calcium, and sulfur (NPKCaS) is 495 ppm to 625 ppm, 540 ppm to 600 ppm, 540 ppm to 590 ppm, or 570 ppm. In certain embodiments, a ratio of the concentration of NPKCaS to the total nutrient concentration is 85% to 95%, 90% to 95%, or 93%. In certain embodiments, a ratio of a concentration of magnesium to the total nutrient concentration is in a range of 5% to 8%, or 6% to 7%, or 7%. In certain embodiments, when diluted in an application, magnesium can be included in a magnesium source with a magnesium concentration of 30 ppm to 50 ppm, 35 ppm to 45 ppm, or 41 ppm. In certain embodiments, when diluted in an application, a concentration of the secondary macronutrients is 175 ppm to 235 ppm, 195 ppm to 215 ppm, 200 ppm to 205 ppm, or 202 ppm. In certain embodiments, a ratio of a concentration of the secondary macronutrients to the total nutrient concentration is 25% to 35%, or 33%. In certain embodiments, a ratio of a concentration of the primary macronutrients and the secondary macronutrients to the total nutrient concentration is 98% to 99.5%

Certain embodiments of a nutrient composition comprise one or more micronutrients, such as boron from a boron source, copper from a copper source, iron from an iron source, manganese from a manganese source, molybdenum from a molybdenum source, and zinc from a zinc source. In certain embodiments, a ratio of a concentration of micronutrients to the total nutrient concentration is in a range of 0.5% to 2%, or 1%. In certain embodiments, when diluted in an application, a concentration of the one or more micronutrients is 3 ppm or greater, 5 ppm or greater, or 5 ppm to 6 ppm.

In certain embodiments, a nutrient composition consists of a nitrogen source; a phosphorus source; a potassium source; a calcium source; a sulfur source; and one or more sources of additional components selected from the group consisting of: magnesium, boron, copper, iron, manganese, molybdenum, and zinc.

The nutrient compositions described herein can be suitable for inclusion in a hydroponic system and/or with a variety of different plant growth mediums. Specifically, the nutrient compositions can be combined with suitable compositions to form garden and potting soils, seeding mulch, flower and vegetable furrow covering applications, and potting mixtures. As can be appreciated, such plant growth mediums can be formed by combining the nutrient composition with the appropriate base composition (e.g., soil, seeding mulch, etc.). In certain embodiments, a suitable base composition can be formed of any materials known in the art. For example, suitable base compositions can be formed of sphagnum, bark fines, perlite, yucca, coconut coir pith, rock wool, wood fiber, and other organic-based compounds.

In certain embodiments, potting mixtures can be substantially free of soil. In other certain embodiments, soil, such as a yard soil, can be included.

In certain embodiments, the nutrient compositions described herein can alternatively be combined with granular base compositions. For example, certain known granular plant growth mediums can include organic-based fertilizers, such as chicken litter, or a controlled-release inorganic fertilizer as a nutrition source.

As can be appreciated, plant growth mediums can include additional components. Such additional components can be substantially unmodified. For example, surfactants (or wetting agents), biostimulants, microbes, and other bioactive materials can be included in plant growth mediums in various embodiments without substantial modification. In certain embodiments, the pH of a plant growth medium can be modified as known in the art through inclusion of known pH adjusting agents. For example, limestone can be added to form plant growth mediums having a pH of about 5 to about 5.5.

Additional components and details about plant growth mediums are disclosed in U.S. Pat. Nos. 4,088,528; 4,185,680; 5,269,634; 5,413,618; 5,542,962; 5,567,220; 5,976,211; 5,900,038; 8,024,890; 6,711,850; European Patent EPO 923 854; and PCT applications WO 99/57079 and WO 99/57080, each of which are incorporated herein by reference.

Examples

Table 1 depicts the concentrations of various nutrients of an Example nutrient composition.

TABLE 1

| | Concentration of Available Nutrient (ppm) |
| --- | --- |
| N | 150 |
| P | 53.71 |
| K | 205.38 |
| S | 54.19 |
| Ca | 107.53 |
| Mg | 41.08 |
| B | 0.3 |
| Cu | 0.17 |
| Fe | 1.91 |
| Mn | 0.73 |
| Mo | 0.05 |
| Zn | 0.21 |

Table 2 depicts the Formulated Nutrient Analysis of various nutrients of an example nutrient composition. Other elements present in the example nutrient composition (e.g., oxygen molecules in a sulfate ion) are not shown.

TABLE 2

| | Formulated Analysis |
| --- | --- |
| N | 10.17% |
| P | 3.64% |
| K | 13.93% |
| S | 3.67% |
| Ca | 7.29% |
| Mg | 2.79% |
| B | 0.02% |
| Cu | 0.012% |
| Fe | 0.13% |
| Mn | 0.049% |

5

TABLE 2-continued

| | Formulated Analysis |
|---|---|
| Mo | 0.0034% |
| Zn | 0.014% |

As used herein, all percentages (%) are percent by weight of the total composition, also expressed as weight/weight %, % (w/w), w/w, w/w % or simply %, unless otherwise indicated.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any technology disclosed or claimed herein or that it alone, or in any combination with any other reference or references, teaches, suggests, or discloses any such technology. Further, to the extent that any meaning or definition of a term in this document conflicts with any meaning or definition of the same term in a document incorporated by reference, the meaning or definition assigned to that term in the document shall govern.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A water-soluble powder comprising a nutrient composition for a hydroponic system, the nutrient composition comprising:
   a nitrogen source;
   a phosphorus source;
   a potassium source;
   a calcium source; and
   a sulfur source,
   wherein the nutrient composition has a nitrogen to phosphorus to potassium (NPK) ratio of 2.5:1:4.5 to 3.5:1:3.5; and
   wherein a ratio of a calcium concentration to a total nutrient concentration is in a range of 17% to 19%.

2. The water-soluble powder of claim 1, wherein the NPK ratio is about 3 to 1 to 4.

3. The water-soluble powder of claim 1, wherein a potassium concentration is greater than the nitrogen concentration.

4. The water-soluble powder of claim 1, wherein a ratio of the concentration of NPKCaS to the total nutrient concentration is 85% to 95%.

5. The water-soluble powder of claim 1, wherein a ratio of a concentration of nitrogen, phosphorus, and potassium to the total nutrient concentration is 60% to 70%.

6. The water-soluble powder of claim 1, wherein:
   a ratio of a nitrogen concentration to the total nutrient concentration is 23% to 25%;
   a ratio of a phosphorus concentration to the total nutrient concentration is in a range of 8% to 10%;
   a ratio of a potassium concentration to the total nutrient concentration is in a range of 30% to 35%; and
   a ratio of a sulfur concentration to the total nutrient concentration is in a range of 8% to 10%.

7. The water-soluble powder of claim 1, further comprising one or more sources of additional components selected from the group consisting of: magnesium, boron, copper, iron, manganese, molybdenum, and zinc.

8. The water-soluble powder of claim 7, wherein the nutrient composition consists of:
   the nitrogen source;
   the phosphorus source;
   the potassium source;
   the calcium source;
   the sulfur source; and
   the one or more sources of additional components selected from the group consisting of: magnesium, boron, copper, iron, manganese, molybdenum, and zinc.

9. A plant growth medium comprising the nutrient composition of claim 1.

10. A method of growing one or more plants comprising providing the nutrient composition of claim 1 to one or more plants.

11. A nutrient composition for a hydroponic system, the nutrient composition, when diluted, comprising:
   one or more primary macronutrients at a concentration of 355 ppm to 440 ppm, wherein the one or more primary macronutrients comprise a nitrogen source, a phosphorus source, and a potassium source; and one or more secondary macronutrients at a concentration of 140 ppm to 235 ppm, wherein the one or more secondary macronutrients comprise a calcium source and a sulfur source; and wherein:

the ratio of a calcium concentration to a total nutrient concentration is in a range of 17% to 19%.

12. The nutrient composition of claim 11, wherein the nutrient composition has a nitrogen to phosphorus to potassium (NPK) ratio of 2.5:1:4.5 to 3.5:1:3.5.

13. The nutrient composition of claim 11, wherein:

the ratio of a sulfur concentration to the total nutrient concentration is in a range of 8% to 10%; and the ratio of a magnesium concentration to the total nutrient concentration is in a range of 5% to 8%.

14. The nutrient composition of claim 11, wherein a ratio of a concentration of the primary macronutrients and the secondary macronutrients to the total nutrient concentration is 98% to 99.5%.

15. The nutrient composition of claim 11, further comprising one or more micronutrients selected from the group consisting of: a boron source, a copper source, an iron source, a manganese source, a molybdenum source, and a zinc source.

16. The nutrient composition of claim 15, wherein a ratio of a concentration of micronutrients to the total nutrient concentration is in a range of 0.5% to 2%.

\* \* \* \* \*